Sept. 28, 1954 G. V. NOLDE ET AL 2,690,303

COUNTER

Filed April 3, 1951 3 Sheets-Sheet 1

INVENTORS
George V. Nolde
Hal K. St. Clair
BY Howard M. Dustin

| | 0 | 1 | 2 | 3 | 4 | 5 | 6 | 7 | 8 | 9 | 10 |
|---|---|---|---|---|---|---|---|---|---|---|---|
| 50 | | X | | X | | X | | X | | X | |
| 51 | | | X | X | | | X | X | | | |
| 52 | | | | | X | X | X | X | | | |
| 53 | | | | | | | | | X | X | |

INVENTORS
George V. Nolde
Hal K. St. Clair
BY Howard M. Dustin

Sept. 28, 1954 G. V. NOLDE ET AL 2,690,303

COUNTER

Filed April 3, 1951 3 Sheets-Sheet 3

INVENTORS
George V. Nolde
Hal K. St. Clair
BY Howard M. Dustin

Patented Sept. 28, 1954 2,690,303

UNITED STATES PATENT OFFICE 2,690,303

COUNTER

George V. Nolde and Hal K. St. Clair, Berkeley, Calif., assignors to Marchant Calculators, Inc., a corporation of California Application April 3, 1951, Serial No. 219,060

10 Claims. (Cl. 235—92)

The present invention relates to electronic decade counting circuits, and more particularly concerns a counting circuit capable of actuating a plural order memory.

Decade counters have been developed which use cascaded stages of vacuum tube trigger circuits as counting elements, for example, the counter disclosed by H. Lifshutz in Physical Review, vol. 57, 1940, "New Vacuum Tube Scaling Circuits," page 243 et seq. Lifshutz disclosed a four stage counter which is advanced in a straight binary progression by input pulses, i. e., the respective stages represent the numeral values 1, 2, 4 and 8. The circuit is coded to a cyclic count of ten by an interstage coupling arrangement which interrupts the binary progression in response to the tenth count and returns the four stages to zero condition.

A somewhat different type of four stage decade counter is exemplified by Grosdoff Patent No. 2,521,788, issued September 12, 1950. The Grosdoff counter includes four trigger circuit stages which are cascaded to a non-binary count, the respective stages representing the numeral values 1, 2, 2 and 4, or 1, 2, 4 and 2. Grosdoff provides a feedback arrangement for establishing a ten count cycle by resetting the trigger circuit stages before the occurrence of a tenth input pulse.

The present invention is of the general type disclosed by the Lifshutz article, supra. The speed and simplicity of such counting circuits, as well as their reliability of operation, render them useful as basic counting units in calculating machines. However, a practical calculating machine must have a plural order accumulator, or memory, and since most of the prior art electronic machines have met this requirement by furnishing one decade counter for each memory order, the use of an undesirably large quantity of electronic equipment has been thereby necessitated. This increases the size and initial cost of the entire machine, as well as its complexity and cost of maintenance.

The decade counter of the present invention is adapted to actuate a plurality of memory orders. This is accomplished by sequentially connecting the counter to two or more memory orders through a commutator, and by storing the count in each order in signal retention devices which have the property of retaining their count-indicating condition after they are disconnected from the counter. In the preferred embodiment of the present counter, the signal retention devices are storage capacitors, one such capacitor being coupled to each counting stage at a point, the potential of which rises and falls in accordance with the value-indicating or zero-indicating condition of the given stage. Four such stages are connected in cascade for operating in binary progression, and means are provided for coding the four binary stages to a cyclic count of ten, with a transfer stage for generating and storing an output signal in response to the end of a cyclic count. Another feature of the present circuit is the provision of means for preventing erroneous interstage coupling during connection of the counter to an ordinal group of storage devices.

It is therefore a primary object of the invention to provide a decade counter which is capable of sequentially actuating a plurality of memory orders.

It is another object of the present invention to set a counting circuit directly to a condition indicative of the stored count of a memory order in response to connection of the counting circuit to the said memory order.

It is a further object of the invention to selectively delay the output of a tens transfer signal in a decade counter.

It is another object of the invention to store information representing ordinally accumulated numeral values in a series of small, inexpensive devices.

It is a further object of the invention to restore a counter to a zero condition subsequent to the dissociation of the counter from one memory order and prior to the association of the counter with a next memory order.

It is another object of the invention to provide an improved decade counter which is both simple and reliable.

Other objects will appear in the following description of a preferred form of the invention and an alternate embodiment thereof, reference being made to the accompanying drawings in which.

GENERAL DESCRIPTION

Figure 1:
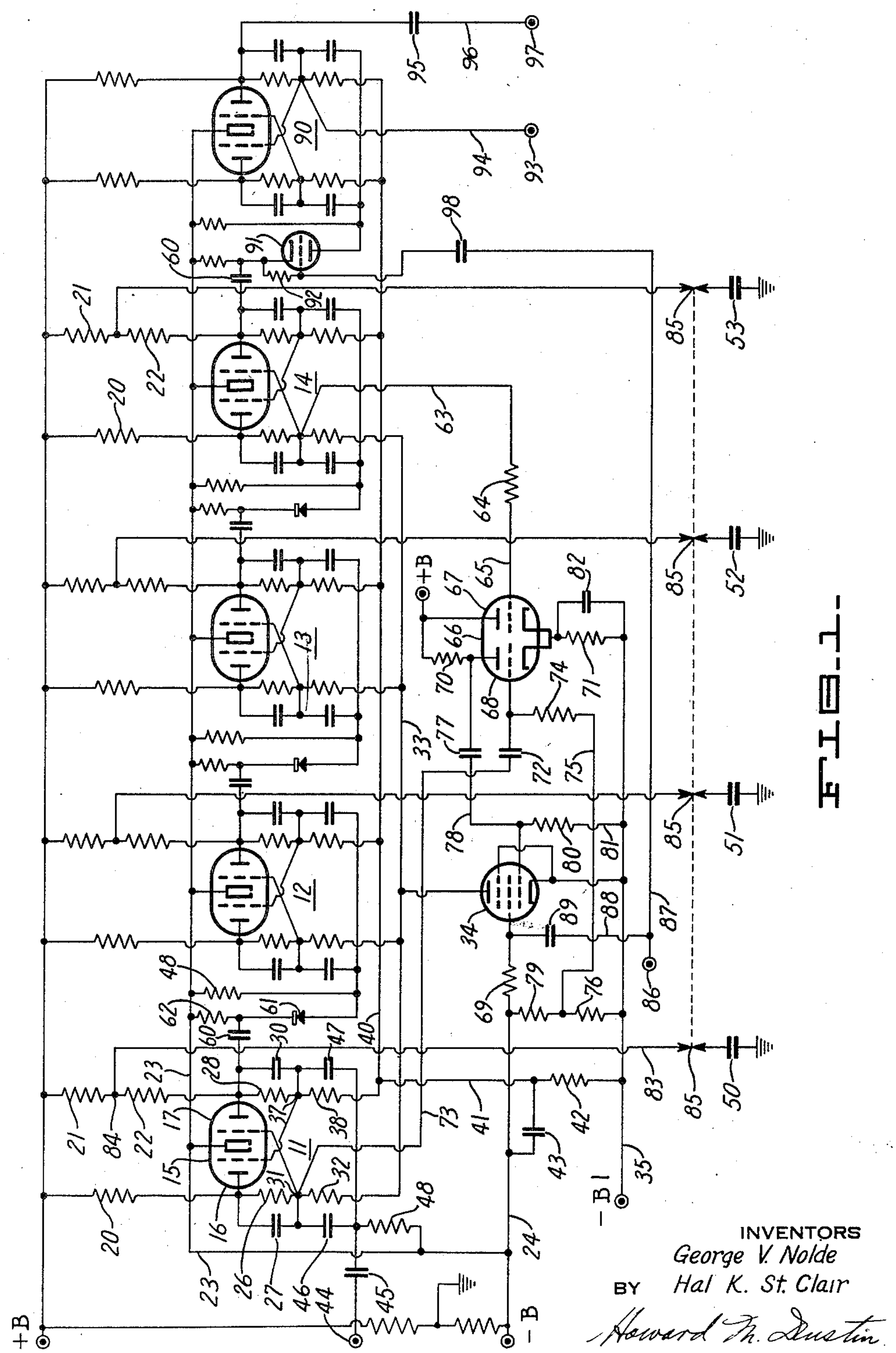
Fig. 1 is a wiring diagram of the counting circuit showing the capacitor memory and the preferred embodiment of the transfer stage.

The present counting circuit comprises a pulse input terminal to the first of four vacuum tube trigger circuit stages, which stages are cascaded to count in ordinary binary progression, a gate circuit which is opened in response to the count of an eighth pulse, and a clearing tube controlled by the opened gate circuit and responsive to the count of a tenth input pulse for resetting the counting stages to zero condition and for closing the gate circuit. The counting circuit further comprises a transfer stage which is set to a transfer-indicating condition in response to the count of a tenth pulse, a means for resetting the transfer stage to zero condition at such time as a transfer pulse is required, and means for causing the transfer stage to generate a transfer pulse in response to such resetting. A commutator is provided for sequentially associating the counter with a plurality of memory orders, and means are provided which are responsive to the association of the counter with any given memory order for conditioning the counter in accordance with the previously stored value in that order.

The present invention is therefore based on the principle of actuating two or more memory orders by means of a single decade counting circuit.

The basic circuit utilized in the counting stages of the invention is the well known "trigger" circuit of the general type described in "Theory and Application of Vacuum Tubes" by Herbert J. Reich. In one of its simplest forms, the trigger circuit includes two vacuum triodes in which the grid of the first triode is coupled to the anode of the second triode through a network comprising a coupling resistor and a coupling capacitor connected in parallel. The grid of the second triode is coupled to the anode of the first triode through a like coupling network. The cathodes of both triodes are maintained at a potential which is negative relative to the anodes, either directly or through suitable cathode resistors. Grid and anode potentials are applied to the respective electrodes through separate resistors. It will appear that such a circuit has two stable operating conditions, viz., with either of the two triodes conducting and its companion triode nonconducting. This is apparent in that the low plate voltage of the conducting triode is impressed on the grid of the other triode and maintains the latter biased below conduction.

In operation, assuming the first triode to be the initially conducting tube, if a negative pulse is applied symmetrically to the grids of both triodes, the anode current of the first triode is reduced and its anode potential becomes more positive. Due to the connection through the aforesaid coupling resistor, the grid potential of the second triode is raised, biasing the second triode to conduction and thereby lowering its anode potential. The decrease in anode potential of the second triode is coupled to the grid of the first triode, further reducing the anode current of the latter. This action continues until the anode current of the first triode is cut off. The second triode then remains conducting until the application of another negative pulse to the grids of the two tubes, when the tube operating conditions are again reversed.

*Counter*

Referring to Fig. 1, each of four counting stages comprises a respective trigger circuit 11, 12, 13, and 14. Each trigger circuit includes a duotriode such as 15, having a left-hand section 16 and a right-hand section 17. The right-hand section hereinafter designated as the "normal"

section, of each trigger circuit tube, is conducting when the counter is in the initial, or zero indicating, condition and the stage is said to be conducting "normally." Conversely, the left-hand section, hereinafter designated the "abnormal" section, of each trigger circuit tube is conducting when the counter is in the value-indicating condition.

Anode potential is supplied to the abnormal section of each stage from a positive terminal +B of a source of unidirectional potential through an anode resistor 20, and to each normal section through two series anode resistors 21 and 22. The combined value of resistors 21 and 22 is substantially equal to the value of resistor 20. The common cathode of each trigger tube is connected by a cathode return lead 23, common to all stages, and a lead 24, to a negative terminal −B of a source of unidirectional potential, completing the anode-cathode circuit of each section. The normal grid of each tube is coupled to the abnormal anode through a resistor 26 paralleled by a capacitor 27, and the abnormal grid is coupled to the normal anode by a resistor 28 paralleled by a capacitor 30. Each normal grid is connected to a point 31 on a respective potential divider comprising terminal +B, abnormal anode resistor 20, coupling resistor 26, a resistor 32, a grid return lead 33, common to all stages, the anode circuit of a normally conducting pentode "clearing" tube 34, a cathode return lead 35, and a negative terminal −B1 of a source of unidirectional potential. The function of the clearing tube will be described in detail hereinafter. The grid of each abnormal section is connected to a point 37 on a respective potential divider comprising terminal +B, normal anode resistors 21 and 22, coupling 28, a resistor 38, a grid return lead 40, common to all stages, a lead 41, a resistor 42, cathode return lead 35, and terminal −B1. The value of resistor 42 is chosen as substantially equal to the conducting plate resistance of pentode 34 to maintain the two grid leads 33 and 40 at approximately the same potential above −B1. A by-pass capacitor 43 is connected between lead 41 and lead 24 to shunt fluctuations in the potential of grid return lead 40 to terminal −B. Summarizing, the grid of each section of a trigger circuit tube is maintained at a potential between +B and −B1 by tapping the grid to a point on a respective potential dividing network. Each of the normal grid potential dividers includes the clearing tube 34, and each of the abnormal grid potential dividers includes the resistor 42, which is parallel to tube 34. By proper choice of the resistor values of the potential divider networks and the respective potential values of terminals +B, −B, and −B1, the grids of each stage are maintained within such a range that each stage acts as a trigger circuit of the type described hereinbefore.

A pulse input terminal 44 is symmetrically coupled to both grids of the first trigger circuit stage through a capacitor 45, which isolates the counting circuit from the pulse generator, and through a respective coupling capacitor 46 and 47 for isolating each of the two grids from the other. Negative input pulses are impressed on terminal 44 and are thereby coupled to both grids. The first input pulse cuts off the anode current of the initially conducting normal section of the first stage to cause the abnormal section to conduct. Each subsequent input pulse likewise reverses the operating condition of the first stage. A resistor 48 is connected between the grid input of each stage and terminal —B by cathode return lead 23 to drain charges stored by coupling capacitors 46 and 47 due to the input pulses.

The normal anode of each stage, except the last, is symmetrically coupled to the grid input of each grid of the succeeding stage through a coupling capacitor 60 and a rectifier 61. Rectifier 61 is connected in such a direction that it passes negative pulses from each stage to the next succeeding stage, while blocking negative pulses in the reverse direction. A respective resistor 62 between each two successive stages is connected to the cathode return lead 23 from a point between capacitor 60 and rectifier 61, and cooperates with capacitor 60 to differentiate pulses from each stage to the succeeding stage.

On the first count, the potential of the normal anode of the first stage rises due to the decreased anode current through resistors 21 and 22. This rise, differentiated into a positive pulse by capacitor 60 and resistor 62, is blocked by rectifier 61. On the second count, the normal section of the first stage resumes conduction and the anode potential of the normal plate falls. This potential drop, differentiated into a negative pulse, is passed by rectifier 61 and impressed upon both grids of the second stage, reversing conduction in that stage. In the same manner, each of the four counting stages, except the first, is reversed once in response to two reversals of the preceding stage.

Since four binary counting stages, such as described above, would, if unmodified, count to fifteen and return to zero condition on the sixteenth count, it is necessary to provide special means for zeroizing such a counter if it is to be cleared on any count other than the sixteenth. To achieve the zeroizing on the tenth count, as is required in the present decimal system counter, the above-mentioned electronic gate is provided to be opened on the eighth count, and a clearing tube is provided to be actuated on the tenth count by a pulse passed through the opened gate. Actuation of the clearance tube zeroizes the four counting stages and closes the gate, thereby returning the circuit to initial zero condition.

The normal grid of the fourth stage is connected by a lead 63, a resistor 64 and a lead 65 to the grid of the right-hand section 67 of a duotriode 66. Tube 66 is arranged as a gate, the right-hand section 67 thereof being connected as a normally conducting cathode follower, and the left-hand section 68 being connected as a normally blocked amplifier. Anode potential for section 67 is supplied directly from terminal +B, whereas anode potential for section 68 is supplied through an anode resistor 70. The cathodes of both sections 67 and 68 are connected to terminal —B1 by a common cathode resistor 71 and cathode return lead 35. The grid of amplifier section 68 is connected to the normal grid of the first counting stage by a coupling capacitor 72 and a lead 73, and is biased to a potential intermediate —B and —B1 through a resistor 74, a lead 75, and a potential divider comprising a pair of resistors 76 and 79 connected between —B and —B1. The anode of section 68 is connected by a coupling capacitor 77 and a lead 78 to a first grid of the above-mentioned normally conducting pentode clearing tube 34. The first grid of tube 34 is returned to terminal —B1 by a resistor 80, a lead 81, and cathode return lead 35. The second grid of tube 34 is biased to —B potential through lead 24 and a resistor 69. The third grid of tube 34 is connected to the cathode. The relative potential values of terminals B, —B and —B1 are such as to maintain tube 34 normally conducting.

It will be recalled that the anode circuit of the clearing tube 34 forms a part of the respective series voltage divider network to which each normal grid of the counting stages is tapped. It therefore appears that if conduction of the clearing tube is cut off, the current flow is decreased through the respective potential divider associated with each normal grid of the counting stages, consequently the potential of each normal grid rises, causing all four stages to conduct "normally," thereby clearing the counter to a zero indicating condition. Operation of the clearing circuit cuts off conduction of the clearing tube in the following manner to perform the above-described clearance of all stages.

During the time the fourth stage conducts normally, its normal grid potential is high and is impressed on the grid of the cathode follower section 67 of gate tube 66. This high potential maintains section 67 conducting. The anode current of section 67, flowing through the common cathode resistor 71, causes a constant potential drop across that resistor, maintaining the cathode potential of amplifier section 68 far enough above —B1 potential that the amplifier section cannot conduct. Therefore, the gate comprising tube 66 is maintained closed as long as the fourth counting stage conducts normally. A positive clearance test pulse is impressed on the grid of amplifier section 68 each time the first counting stage reverses from abnormal to normal conduction, i. e., in response to each even-numbered input pulse. This is due to the rise in potential of the first stage normal grid on the even counts. The positive pulse so formed is coupled to the grid of amplifier section 68 through lead 73 and capacitor 72. However, these positive pulses are of insufficient magnitude to bias section 68 to conduction as long as the normal conduction of the fourth stage maintains the gate closed as described above.

Since the four counting stages are reversed in accordance with the ordinary binary progression described hereinbefore, it will appear that the fourth counting stage is reversed to abnormal conduction for the first time on the eighth count, lowering the fourth stage normal grid potential due to the increased drop across the fourth stage abnormal anode resistor 20. This decreased potential is impressed on the grid of cathode follower section 67 by lead 63, resistor 64, and lead 65, lowering the grid bias on section 67 to decrease the potential drop across cathode resistor 71 and thereby lower the cathode potential of amplifier section 68 towards —B1 level. The drop in cathode potential of section 68 is sufficient to bias that section to a potential which is slightly below conduction level, so that the next positive pulse impressed on its grid is amplified to initiate the clearance operation. It will be recalled that such a clearance test pulse is coupled from the first counting stage to the grid of section 68 in response to each even-numbered input pulse. Therefore, when the gate 66 is opened in response to the eight pulse, in the manner described above, a positive pulse is impressed on the grid of section 68, and if allowed to be amplified by the opened gate circuit, would prematurely initiate clearance, since clearance must occur in response to the tenth, not the eight, pulse. To delay the opening of gate 66 until the recession of the above-mentioned positive pulse on the eighth count, a by-pass capacitor 82 is connected in parallel to the gate circuit cathode resistor 71. Therefore, when the cathode follower section 67 is biased to decreased conduction by a negative pulse on the eighth count, as described above, its cathode potential drops exponentially due to the discharging of capacitor 82 through cathode resistor 71. By proper choice of the values of resistor 71 and capacitor 82, the rate of fall in cathode potential of the gate tube is kept sufficiently slow to maintain the amplifier section 68 biased well below conduction, and therefore the gate closed, until approximately the ninth count, at which time the eighth count positive pulse has disappeared from the amplifier section grid.

In response to the tenth input pulse, i. e., the next even-numbered pulse following the eighth, another positive pulse is fed from the first stage normal grid to the amplifier section 68, and is there amplified. This pulse appears on the plate of section 68 as a negative "clearance initiating" pulse and is coupled through capacitor 77 and lead 78 to the first grid of the clearing tube 34, biasing the clearing tube below conduction to raise the normal grid potential of each counting stage and thereby clear the counter to zero condition as described hereinbefore.

At the termination of the single clearance test pulse which is amplified by section 68 of the gate tube, the anode potential of that section rises, returning the first grid of the clearing tube 34 to conduction level. The anode current through tube 34, and therefore the current through the potential divider associated with each normal grid, is thereby restored to the usual operating level in preparation for further counting.

When the fourth stage is reversed to normal conduction in response to cutoff of the clearing tube, the potential of the fourth stage normal grid rises. This potential rise is impressed on the grid of the cathode follower section 67 of gate tube 66 through lead 63, resistor 64, and lead 65, and biases section 67 to increased conduction. Consequently, the cathode potential of the gate tube 66 rises, biasing amplifier section 68 well below conduction to close the gate. Therefore, at the end of the tenth count, the four counting stages and the gate and clearing tubes are in initial zero condition in preparation for further counting.

*Preferred embodiment of memory*

The present counting circuit is adapted to be associated, seriatim, with a plurality of memory orders for storing, in each such order, information which represents the sum of the respective stored and selected ordinal values. At the time the counting circuit is associated with a given memory order, the condition of that order, representing the total previously stored ordinal value, positively presets the four counting stages to respective conditions of operation which, collectively, represent the said stored ordinal value. Following such presetting, a number of pulses, representing the selected ordinal value which is to be added to the stored value, is introduced into the counting circuit, advancing the circuit to a representation of the sum of the aforesaid selected and stored values. The condition of the particular memory order which is connected to the counter during a given count is progressively altered under control of the counter and, at the termination of the input pulses, likewise represents the sum of the selected and stored values.

In the preferred embodiment shown in Fig. 1, each memory order comprises four memory capacitors 50–53, one such capacitor being associated with each of the four counting stages. One terminal of each memory capacitor is grounded, the other terminal being connected by a lead 83 to the respective associated counting stage at a respective point 84 between the two normal section anode resistors 21 and 22. During normal conduction of any stage, the potential of point 84 is lower than during abnormal conduction of that stage. This is due to the anode current through anode resistors 21 and 22 during normal conduction. The potential of each point 84 is impressed by lead 83 directly on the associated memory capacitor 50–53, and, therefore, each rise or fall of that potential augments or diminishes the charge on the capacitor. Therefore, the respective charges on capacitors 50–53, taken collectively, represent, in a four signal code, the total stored count following each input pulse.

Figures 2, 3:
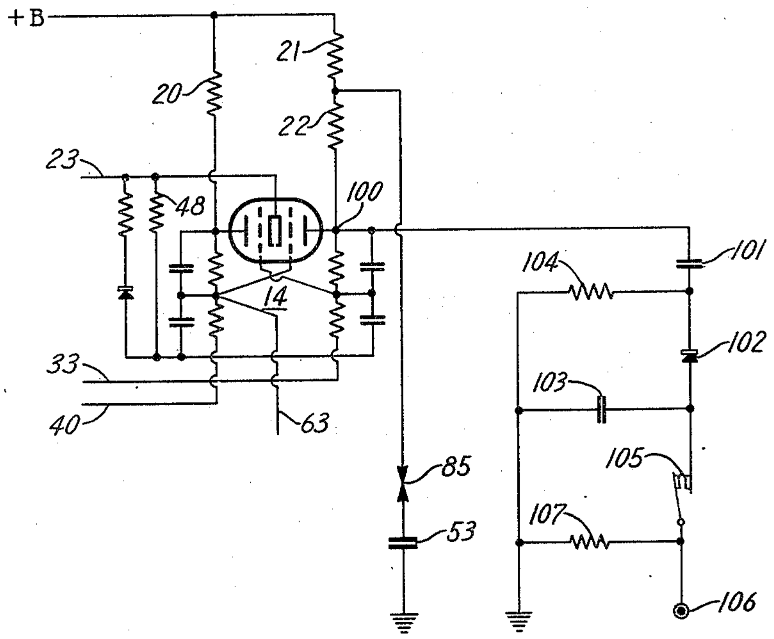
Fig. 2 is a table of the charge-bearing condition of the four memory capacitors of a single memory order at the completion of each integer of a count from one through ten.
Fig. 3 is a wiring diagram of an alternate embodiment of the transfer stage.

Fig. 2 illustrates the charge-bearing condition of the four memory capacitors 50–53 at the end of each count, i. e., after the four counting stages have reached a stable condition following each input pulse into the counting circuit. Each row of the chart in Fig. 2 bears a reference numeral 50–53 and represents the corresponding memory capacitor. Each column bears a number 0–10, representing the total number of input pulses prior to the indicated condition of the four capacitors. An "X" in any position indicates that the designated capacitor is charged to the above-mentioned higher potential level upon completion of the designated count; the absence of an "X" in any position indicates that the designated capacitor is charged to the lower potential level upon completion of the indicated count. It is noted that after the tenth count, all four memory capacitors of the order being considered are charged to the lower potential level, i. e., are collectively in the zero-indicating condition.

*Alternate embodiment of memory*

Figure 4:
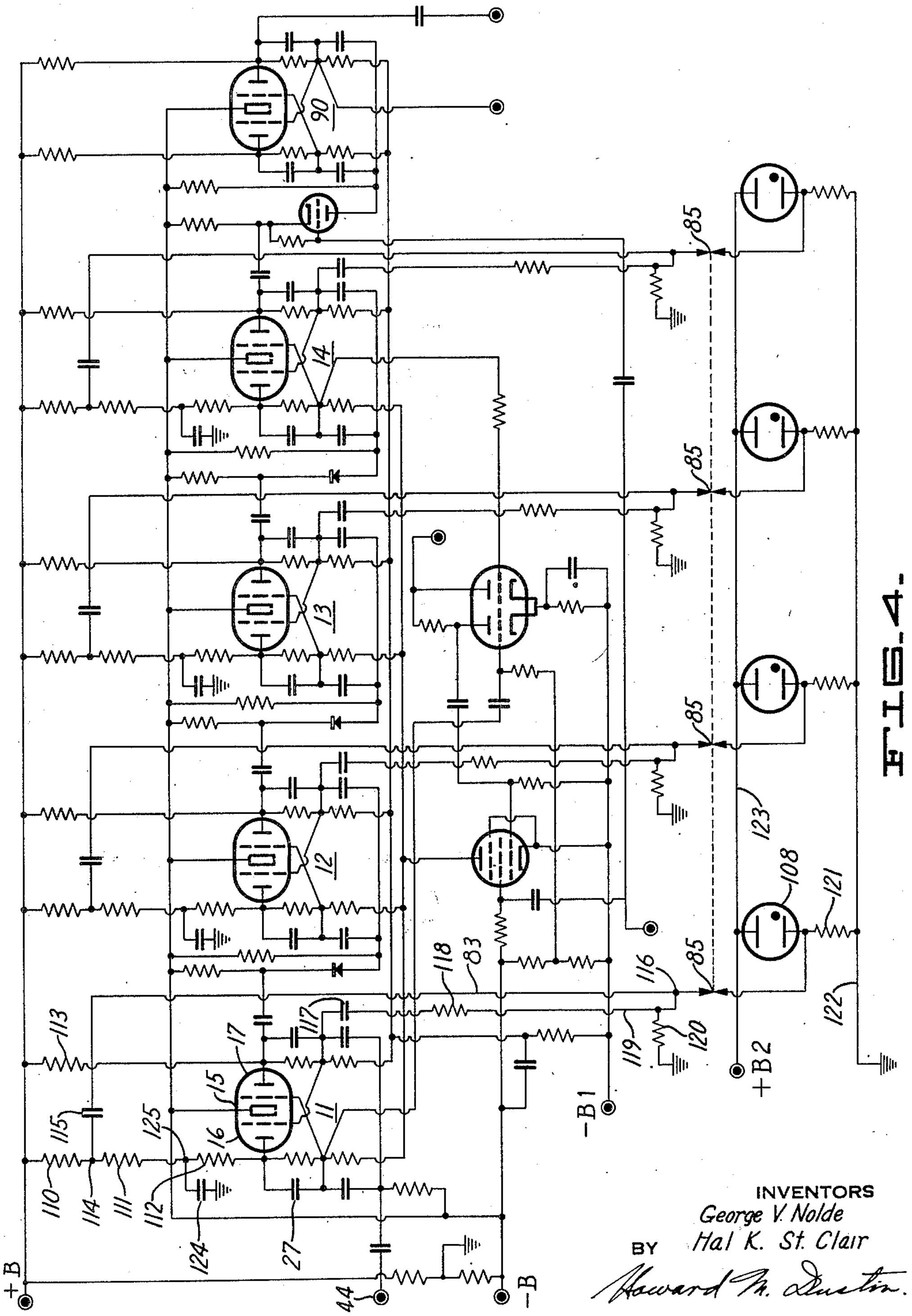
Fig. 4 is a wiring diagram of the counting circuit, showing the discharge tube memory.

Fig. 4 illustrates a neon tube memory and the circuitry for associating the same with the four counting stages. In this embodiment of the circuit, a respective neon tube or similar gas discharge device 108 is coupled to each counting stage and is caused to conduct or not conduct in accordance with the abnormal or normal condition of the associated counting stages. Corresponding elements of Figs. 1 and 4 are assigned the same reference numerals, and only those components of the circuit of Fig. 4 which differ from the circuit of Fig. 1 will be described. The counting action, interstage couplings, and decimal coding are identical as between the two circuits.

As shown in Fig. 4, the abnormal anode resistor of each stage is divided into three unit resistors, 110, 111 and 112, and the normal anode resistor of each stage is a single unit 113. One electrode, hereinafter designated the "cathode," of the neon tube associated with each stage is coupled to a point 114 between the abnormal anode resistors 110 and 111 of the associated stage by a circuit comprising a capacitor 115, lead 83 and commutator contacts 85. The abnormal grid of each stage is coupled to a respective point 118 between the associated capacitor 115 and the associated commutator contacts 85 by a respective circuit comprising a capacitor 117, a resistor 118 and a lead 119. The point 116 in each stage is grounded through a respective resistor 120. The cathode of each neon tube 108 is grounded through a respective resistor 121 and a common lead 122. The second terminal, hereinafter designated the "anode," of each neon tube 108 is connected by a common lead 123 to the positive terminal +B2 of a source of unidirectional potential. The +B2 potential, which is therefore applied across each neon tube, is sufficient to sustain conduction in each of these tubes, but is insufficient to initiate such conduction. Opertaion of the memory is as follows.

Assuming that the first stage neon is not conducting and that the first stage trigger circuit is conducting normally, an input pulse impressed on input terminal 44 reverses the first stage to abnormal conduction in the manner described hereinbefore. The increased current through abnormal anode resistors 110, 111 and 112 causes the potential of point 114 to drop, coupling a negative pulse to the cathode of the first stage neon through capacitor 115, lead 83, and commutator contacts 85. This pulse is conducted to ground through resistor 121 and develops sufficient potential across resistor 121 to lower the cathode potential of tube 108 to ignition level, thereby firing the tube. The +B2 potential is sufficient to sustain conduction in tube 108, as mentioned above.

When the first stage trigger circuit is subsequently reversed to normal conduction on the next count, the potential at point 114 rises and a positive pulse is coupled to the cathode of tube 108 through the circuit described above. This pulse is likewise developed across resistor 121 and raises the cathode potential of tube 108 sufficiently to extinguish that tube.

Count storage in the second, third and fourth stages is accomplished in the identical manner, so that the conduction of a neon in any stage represents, and is concurrent with abnormal conduction of the associated trigger circuit stage.

It will be recalled that each order of the memory must preset the counter to the value stored in the memory order when the counter is associated, by the commutator, with that order. Furthermore, the counter must be zeroized prior to being associated with each memory order. Thus, when the commutator connects the counter to a given memory order, any conducting neon tube or tubes in the given order must cause the associated trigger stage or stages to conduct abnormally, and any non-conducting neon must have no effect upon its associated trigger stage.

If any neon tube 108 is conducting when it is associated, by the commutator, with the counter, its cathode potential is higher than the potential of the point 116 in the corresponding stage, due to the drop across cathode resistor 121. Therefore, a positive pulse is coupled to the abnormal grid of the trigger circuit through commutator contacts 85, lead 119, resistor 118 and capacitor 117. This pulse raises the potential of the abnormal grid of the trigger circuit, thereby reversing the stage to abnormal conduction to represent the count-indicating condition of the associated neon tube.

The above-mentioned positive pulse from the cathtode of tube 108 is also impressed on point 114 of the associated trigger stage through commutator contacts 85, lead 83, and capacitor 115. In order to prohibit this pulse from affecting the normal grid of the trigger circuit, a respective capacitor 124 is connected between ground and a point 125, in each stage, between anode resistors 111 and 112. Capacitor 124 shunts the above-mentioned positive pulse to ground, preventing it from being coupled to the normal grid through abnormal anode resistor 112 and the cross-connected coupling capacitor 27.

*Preferred embodiment of transfer circuit*

If the sum of any accumulated ordinal value exceeds ten after being augmented by the selected value entered into that order, a transfer count must be entered into the next higher order. Since, in the present invention, a single counting circuit is used to actuate a plurality of memory orders, it is necessary to store the transfer count until the counting circuit is connected to the memory order next higher than the order in which such transfer count was generated.

In the preferred embodiment of the transfer circuit, shown in Figs. 1 and 4, a transfer stage 90, comprising a trigger circuit, is connected in cascade to the fourth counting stage. The transfer stage is actuated in the same manner as are the counting stages. Pulses are coupled from the normal anode of the fourth counting stage to the transfer stage through a circuit comprising coupling capacitor 60 and a triode 91. The grid and cathode of tube 91 are connected by a resistor 92 so that each negative pulse coupled from the fourth stage and impressed on the cathode of tube 91 causes that tube to conduct. Thus, tube 91 functions normally as a diode, performing the same functions as interstage rectifiers 61 described hereinbefore.

It will appear that a negative pulse is coupled from the fourth counting stage to the transfer stage only upon the tenth count, when the fourth counting stage is reversed from abnormal to normal conduction by the clearing tube 34. This pulse reverses the transfer stage from normal to abnormal conduction and constitutes the storage of a transfer count.

At the time when it is desired to make use of the transfer count, a negative transfer test pulse is applied to the abnormal grid of the transfer stage through a test terminal 93 and lead 94. If no transfer count has been stored, this negative pulse merely biases the abnormal stage farther below conduction. However, if a transfer count has been stored, the abnormal section of the transfer stage is conducting and is biased below cutoff by the negative transfer test pulse, thereby reversing the transfer stage back to normal conduction. When the normal section of the transfer stage resumes conduction, its anode potential drops, coupling a negative pulse to a transfer output terminal 97 through a coupling capacitor 95 and a lead 96.

It is to be noted that the potential divider networks for both the normal and the abnormal sections of the transfer stage are completed to —B1 through grid return lead 40, lead 41, resistor 42, and cathode return lead 35 so that the transfer stage, unlike the counting stages, cannot be reversed by cutoff of the clearing tube 34.

*Commutation*

Following the entry of a selected ordinal number of pulses into the counting circuit, the counter is disconnected from the four memory capacitors or neon tubes with which it was associated during such entry. The counter is then connected to the group of memory devices constituting a next memory order. A conventional commutator with four contacts may be used to perform this seriatim switching of the counter. The commutator contacts are schematically shown in Fig. 1 at 85, each pair of contacts being interposed between a respective capacitor 50–53 and its associated lead 83 to a counting stage.

During each commutation interval, the counter is cleared while it is disconnected from all memory orders. For this purpose, a negative pulse is applied from any conventional source to a clearing terminal 86. Terminal 86 is coupled to the second grid of the clearing tube 34 by leads 87 and 88, and a coupling capacitor 89. The negative pulse so coupled to tube 34 biases that tube below conduction, whereupon the counting stages are cleared in the manner fully described hereinbefore. In order to isolate the transfer stage during the inter-order clearance, and thereby to prevent an erroneous transfer storage during such clearance, the negative clearing pulse which is impressed on terminal 86 is also coupled to the grid of the above-described triode 91, by a lead 87 and a capacitor 98, biasing tube 91 so far below conduction level that it will not conduct a negative reversing pulse received from the fourth stage as a result of the clearance.

Upon connection of the counting circuit to any given memory order, the charges which have been stored, during a previous count, on the respective memory capacitors in that order, are impressed on the points 85 of the associated counting stages. Since all four counting stages have been set to normal conduction immediately prior to this time, as described above, the abnormal grid of each counting stage is at low potential. When the memory capacitors of the given order are connected to the counter, those capacitors which have been previously charged to the higher potential level impress a rise in potential on their respective associated abnormal grids through the resistors 22 and 28 of the associated stages, reversing the affected stages to abnormal conduction, and thereby presetting the counter to the value previously stored in the memory order. In each stage which is so reversed during presetting, the increased potential drop across the associated abnormal anode resistor 20 forms a negative pulse at the abnormal anode. However, the interstage rectifiers 61, described hereinbefore, prevent the feedback of any such negative pulse to the preceding stage.

Fig. 3 illustrates an alternate embodiment of the transfer stage and shows its connection to the fourth stage of the counter.

When the fourth counting stage is reversed to normal conduction on the tenth count, as described hereinbefore, the potential of its normal plate at point 100 drops due to the increased current through anode resistors 21 and 22. This voltage drop is coupled through a coupling capacitor 101 and a rectifier 102 to a transfer storage capacitor 103, storing a negative charge thereon. A resistor 104 is connected to ground from a point between capacitor 101 and rectifier 102 to develop a voltage below ground from the above-mentioned negative pulse received from the counter. Capacitor 103 is connected to one contact of a normally open switch 105. The other contact of switch 105 is connected to a transfer output terminal 106. When it is desired to use the transfer signal, switch 105 is closed by any conventional means, such as a cyclic commutator, and if a transfer charge has been stored on capacitor 103, it is impressed on the transfer output terminal 106. The output voltage is developed across a resistor 107 shunted between the output terminal and ground.

We claim:

1. In an electronic counting circuit having four trigger circuit stages connected in cascade to provide operation of each of said stages except the first in response to two operations of the next preceding stage, and having means coupled to the first of said stages for applying input pulses thereto, each of said pulses being effective to operate said first stage; the combination of, output means for deriving a pulse from the fourth stage in response to ten of said input pulses, said output means including, a normally closed gate circuit coupled to the fourth stage and biased thereby to an open condition in response to an eighth input pulse, a clearing tube normally biased by said gate circuit to an initial mode of operation, means responsive to the occurrence of a tenth input pulse for coupling a pulse from the first stage through said gate to bias the clearing tube to a second mode of operation, a coupling from the clearing tube to the fourth stage for operating the fourth stage in response to said second condition of operation of the clearing tube, and a coupling from the clearing tube to the second stage and effective in response to said second condition of operation of the clearing tube for preventing a normal operation of the second stage.

2. In an electronic counting circuit, the combination of, a plurality of trigger circuit stages each stage including a pair of electron discharge elements having a respective anode, cathode and grid, the grids and anodes of each pair of said elements being cross-connected, means connecting said stages in cascade to provide operation of each of said stages except the first in response to two operations of the next preceding stage, means coupled to the first of said stages for applying input voltage pulses thereto, a normally closed gate circuit coupled to a grid of the last stage and biased thereby to an open condition in response to a predetermined count, means for coupling a clearance test pulse from the first stage to the gate circuit in response to each two of said input pulses, a normally ineffective clearing tube, means responsive to the coincidence of a clearance test pulse and said open condition of the gate circuit for coupling a clearance initiating pulse from the gate circuit to the clearing tube to bias the clearing tube to an effective condition of operation, a coupling from the clearing tube to the last stage for operating the last stage in response to said effective condition of the clearing tube, a coupling from the clearing tube to the second stage and effective in response to said effective condition of the clearing tube to prevent a normal operation of the second stage, and means including a part of the last stage responsive to the last aforesaid operation of the last stage for generating an output pulse.

3. In an electronic counting circuit having four trigger circuit stages connected in cascade to provide operation of each of said stages in response to two operations of the next preceding stage, and having means coupled to the first of said stages for applying input voltage pulses thereto, each of said pulses being effective to operate said first stage, selectively operable means for clearing said trigger circuits to an original condition thereof, said means including, a clearing tube normally biased to an initial condition of operation, selectively operable means coupled to the clearing tube for applying a voltage pulse thereto to bias the clearing tube to a second condition of operation, and a respective coupling from the clearing tube to each of said trigger circuits for applying a clearing signal to each of said trigger circuits in response to said second condition of operation of the clearing tube.

4. A decade counter having, a plurality of counting stages coupled in cascade to render each of said stages except the first operable in response to two operations of the next preceding stage, means coupled to the counter for applying input voltage pulses thereto, and means inter-coupling certain of said stages for causing the counter to complete a cycle of operation in response to ten input pulses; the combination of, a respective memory device associated with each counting stage, and means for coupling each memory device to its respective associated counting stage for enabling said counting stage to set its associated memory device to a value-representing condition and to reset the same to a zero-representing condition, respectively, in response to alternate operations of said counting stage, a transfer stage comprising a transfer device normally in a first condition of operation, a coupling between said transfer device and the last counting stage for causing the transfer device to assume a second condition of operation in response to the completion of a cycle of operation, selectively operable means effective in coincidence with said second condition of operation of the transfer device for causing the latter to generate a transfer pulse, a normally ineffective transfer blocking device interposed between the last counting stage and the transfer stage, a selectively operable control means coupled to said blocking device for rendering the latter effective to disable said coupling between the fourth counting stage and the transfer device.

5. In a decade counter having, a plurality of counting stages coupled in cascade for operation in binary progression, means intercoupling certain ones of said stages for causing the counter to complete a cycle of operation in response to ten input pulses; the combination of, a respective memory capacitor associated with each counting stage but normally disconnected therefrom, means for connecting each memory capacitor to its respective associated counting stage for enabling each charged capacitor to cause operation of its respective counting stage, means coupled to the counter for applying input pulses thereto, and means including a part of each counting stage for charging and discharging, respectively, each memory capacitor in response to alternate operations of its associated counting stage.

6. In a decade counter having, a plurality of counting stages coupled in cascade for operation in binary progression, and means inter-coupling certain ones of said stages for causing the counter to complete a cycle of operation in response to ten input pulses; the combination of, a first ordinal group of memory capacitors, one of said capacitors being associated with each counting stage but normally disconnected therefrom, means for connecting each of said memory capacitors to its respective associated counting stage to enable each charged capacitor to cause operation of its respective counting stage, means coupled to the counter for applying input pulses thereto, and means including a part of each counting stage for charging and discharging, respectively, each of said memory capacitors in response to alternate operations of its associated counting stage, a second ordinal group of memory capacitors, one of said second group being associated with each counting stage, and means for commutating each counting stage from its first to its second associated memory capacitor.

7. In a decade counter having, a plurality of counting stages coupled in cascade for operation in binary progression, and means inter-coupling certain ones of said stages for causing the counter to complete a cycle of operation in response to ten input pulses; the combination of, a respective conducting or extinguished discharge tube associated with each counting stage but normally disconnected therefrom, each of said tubes having at least two electrodes, means coupled to the electrodes of each of said tubes for applying thereto a potential which is insufficient to initiate conduction in any of said tubes but which is sufficient to sustain conduction in any of said tubes, means for coupling one electrode of each of said tubes to its associated counting stage for enabling each conducting one of said tubes to cause operation of its respective counting stage, means coupled to the counter for applying input pulses thereto, and means including a part of each counting stage for firing and extinguishing, respectively, the associated discharge tube in response to alternate operations of a counting stage.

8. A decade counter having, a plurality of counting stages coupled in cascade for operation in binary progression, and means inter-coupling certain ones of said stages for causing the counter to complete a cycle of operation in response to ten input pulses; the combination of, a first ordinal group of conducting or extinguished discharge tubes, one of said tubes being associated with each counting stage but normally disconnected therefrom, at least two electrodes for each of said tubes, means coupled to the electrodes of each tube for applying thereto a potential which is insufficient to iniate conduction in any of said tubes but which is sufficient to sustain conducton in any of said tubes, means for coupling one electrode of each of said tubes to its associated counting stage for enabling each conducting one of said tubes to cause operation of its respective counting stage, means coupled to the counter for applying input pulses thereto, means including a part of each counting stage for firing and extinguishing, respectively, the associated discharge tube in response to alternate operations of a counting stage, a second ordinal group of discharge tubes, a respective one of said second group of tubes being associated with each counting stage, and means for commutating each counting stage from its first to its second associated discharge tube.

9. In a counting circuit having four trigger circuit stages connected in cascade to render each of said stages except the first operable in response to two operations of the next preceding stage, and having means coupled to the first of said stages for applying input pulses thereto, each of said pulses being effective to operate said first stage; the combination of, a respective memory device associated with each trigger circuit stage, means coupling each memory device to its associated trigger circuit for enabling said trigger circuit to set its associated memory device to a value-representing condition and to reset the same to a zero-representing condition, respectively, in response to alternate operations of said trigger circuit, output means for deriving a pulse from the fourth stage in response to ten of said input pulses, said output means including, a normally closed gate circuit coupled to the fourth stage and biased thereby to an open condition in response to an eighth input pulse, a clearing tube normally biased by said gate circuit to an initial mode of operation, means responsive to the occurrence of a tenth input pulse for coupling a pulse from the first stage through said gate to bias the clearing tube to a second mode of operation, a coupling from the clearing tube to the fourth stage for operating the latter in response to the said second condition of operation of the clearing tube, and a coupling from the clearing tube to the second stage and effective in response to said second condition of operation of the clearing tube for preventing operation of the second stage.

10. In a decade counter having, a plurality of counting stages coupled in cascade for operation in binary progression, means interconnecting certain ones of said stages for causing the counter to complete a cycle of operation in response to ten input pulses; the combination of, a respective memory device associated with each counting stage but normally disconnected therefrom, means for connecting each memory device to its respective associated counting stage for enabling each device to cause operation of its respective counting stage, means coupled to the counter for applying input pulses thereto, and means including a part of each counting stage for activating and deactivating, respectively, each memory device in response to alternate operations of its associated counting stage.

References Cited in the file of this patent

UNITED STATES PATENTS

| Number | Name | Date |
|---|---|---|
| 2,416,793 | Compton | Mar. 4, 1947 |
| 2,461,438 | Page et al. | Feb. 8, 1949 |
| 2,514,054 | Hallden | July 4, 1950 |
| 2,521,774 | Bliss | Sept. 12, 1950 |
| 2,536,955 | Palmer et al. | Jan. 2, 1951 |
| 2,538,122 | Potter | Jan. 16, 1951 |
| 2,552,760 | Baker | May 15, 1951 |

OTHER REFERENCES

Predetermined Counter, R. J. Blume; "Electronics," Feb. 1948; pages 88–93.